United States Patent Office 2,729,803
Patented Jan. 3, 1956

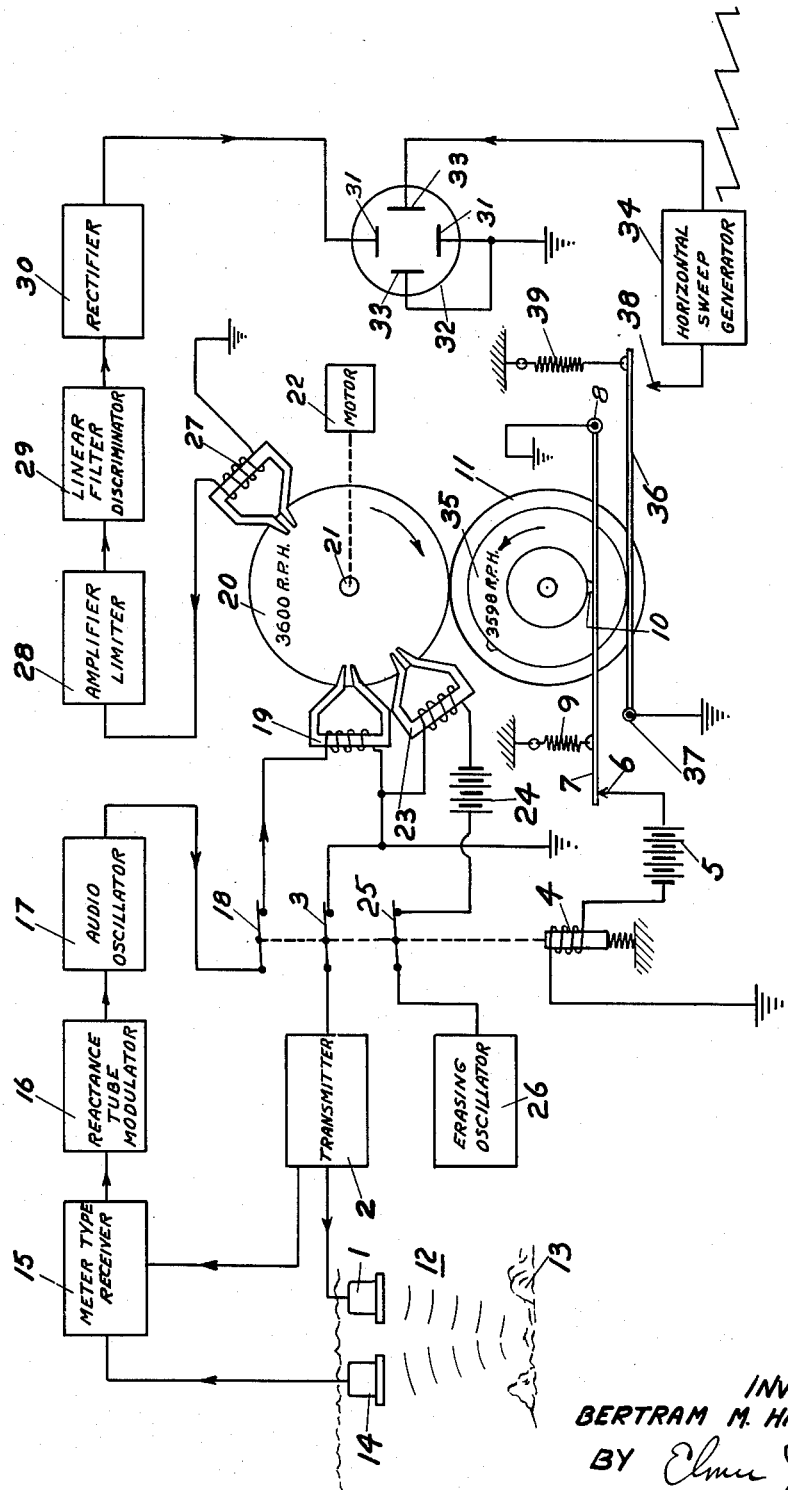

2,729,803

RECORDING DEPTH SOUNDER

Bertram M. Harrison, Wellesley Hills, Mass., assignor to Raytheon Manufacturing Company, Newton, Mass., a corporation of Delaware Application December 22, 1949, Serial No. 134,558

8 Claims. (Cl. 340—3)

This invention relates to information recording devices, and more particularly to recording devices adapted to measure and record the distance between the measuring device and a distant object, the measuring device being, for example, in a boat and the distance object being, for example, the bottom of the ocean below the boat.

In recording depth sounders used at present there is a roll of sensitized paper across which a stylus is drawn. When signals are picked up by the receiver they energize the stylus to produce a mark on the sensitized paper, the position of the mark corresponding to the depth of the water. Sensitized paper has several disadvantages. For example, the paper may be used only once and the expense of constantly replacing the sensitized paper represents a considerable percentage of the overall operating expense of the depth sounder. In addition, the adjustment of the stylus on the sensitized paper is critical if correct marking without tearing of the paper is to be obtained.

This invention relates to a recording depth sounder wherein the measured depth is recorded on a magnetic medium. This magnetic medium may be used again by simply erasing the previous depth recordings. Further, this invention discloses a medium for continuously displaying simultaneously all of the depth recordings stored in the magnetic medium. In addition, the structure of this invention provides means for automatically erasing the depth recording which has been stored the longest in order to make room for a new depth recording.

Other features and advantages of this invention will be apparent as the description thereof progresses reference being had to the accompanying drawing wherein the single figure illustrates a functional block diagram of a specific embodiment of this invention.

Referring now to the drawing, there is shown a sound transducer 1 which is fed by periodically energized transmitter 2. Transmitter 2 is periodically energized by means of an electrically operated switch 3 actuated by a solenoid 4. One end of solenoid 4 is grounded and the other end thereof is connected through a battery 5 to a stationary contact 6 of a set of breaker points. The movable contact 7 of the breaker points comprises an arm pivoted, as at 8, and connected to ground. Movable contact 7 is normally biased open by a spring 9 and is periodically closed by a cam 10 attached to a rotating disk 11 to be more completely described presently. The transmitter 2 could be internally keyed by any desired means to produce a pulse of electrical energy periodically, thereby eliminating the solenoid operated switch 3. Electrical energy generated by the transmitter 2 is fed to the transducer 1 whereupon it is converted into sonic energy in a well-known manner and projected into a sound transmitting medium 12 shown here, by way of example, as water. The sonic energy is directed towards the bottom 13 of the water body 12 and is reflected by said bottom in a well-known manner. The reflected energy impinges upon a receiving transducer 14 which converts the reflected energy into electrical signals. The electrical energy developed by transducer 14 is fed to a meter type receiver 15 which measures the time interval between a signal fed thereto directly from transmitter 2 and the signal received by transducer 14. This receiver produces a direct current voltage whose amplitude varies as a function of the time interval between the two aforementioned signals. This type of receiver is well known in the art and is described in greater detail in Patent No. 2,009,459, to Edwin E. Turner, dated July 30, 1935. The varying direct current voltage produced by receiver 15 is fed to a reactance tube modulator 16 of any desired type well known in the art which produces an output impedance whose reactance varies proportionately with the input potential. The output impedance of the modulator 16 is placed in parallel with the tuned circuit of an audio oscillator 17 with the result that variations in the output impedance of modulator 16 produces variations in the frequency of the audio oscillator 17. By proper design of receiver 15, modulator 16 and oscillator 17 in accordance with principles well known to persons skilled in the art, the frequency of audio oscillator 17 may be made to vary as a linear function of the time interval between the two signals fed to receiver 15 and therefore will vary linearly with variations in the depth of the water body 12. By way of example, the frequency of the audio oscillator 17 may be made to increase as a linear function of the depth of the water body 12. The output of audio oscillator 17 which may vary, for example, from 500 to 5000 cycles corresponding to a depth of, for example, 0 to 400 fathoms, is fed through a second switch 18, ganged to switch 3 and operated by solenoid 4, to an electromagnetic recording head 19. Recording head 19 is stationarily mounted in proximity with the outer edge of a disk 20 of magnetizable material which rotates about an axis 21 and is driven by a motor 22 at a speed of, for example, 3600 revolutions per hour. The rim of disk 20 frictionally contacts the rim of disk 11, thereby causing rotation of disk 11 which, in turn, rotates cam 10 to periodically actuate the solenoid 4 through closure of contacts 6 and 7. The diameter of disk 11 is such that it rotates substantially one revolution for every revolution of disk 20, the speed of disk 11 being, for example, 3598 revolutions per hour. Thus it may be seen that once every revolution of disk 11 and substantially once every revolution of disk 20, switch 18 is closed through energization of solenoid 4, thereby permitting the energization of recording head 19 by oscillator 17. This results in the recording of the frequency of audio oscillator 17 on the magnetizable disk 20 for a small elemental section during each revolution of the disk 20. However, since the speed of disk 11 differs from the speed of disk 20 by two revolutions per hour, the position of the elemental area under the recording head 19 will progressively move around the periphery of the disk 20 making one full revolution each half hour. Since the frequency of oscillator 17 is a measurement of the depth of the water, and this frequency is recorded once every revolution of disk 20, there will be recorded on disk 20 around the periphery thereof the depths of the water for substantially the past half hour.

In order to remove the recorded frequencies which have remained on the disk 20 for substantially a half hour, there is positioned adjacent recording head 19 a magnetic erasing head 23. Erasing head 23 is connected through a battery 24 and a third switch 25 operated by solenoid 4 to an erasing oscillator 26 which may have, for example, a frequency on the order of 30 kilocycles. The magnitude of the voltage of battery 24 should be substantially equal to the peak voltage generated by oscillator 26. When solenoid 4 is energized causing the recording of information by recording head 19, switch 25 is simultaneously closed, thereby causing the erasing oscillations to be applied to the erasing head 23, thereby erasing information on the elemental area of the periphery of disk 20 which is under erasing head 23. The rotation of disk 20 is such that the elemental areas magnetized by recording head 19 move substantially entirely around the periphery of disk 20 before they are positioned under erasing head 23 at the time head 23 is energized by closure of switch 25.

Positioned adjacent the periphery of disk 20 is a magnetic pickup head 27 which is successively energized by all the signals stored in the disk 20 as the periphery of said disk rotates past the pickup 27. The signals picked up by pickup head 27 are fed to an amplifier limiter 28 such that the output thereof will be of constant amplitude but varying in frequency. The output of amplifier limiter 28 is fed to a linear filter discriminator 29 which may be of any desired type, such as a $\pi$ or T-section resistance capacitance filter. Filter 29 has its circuit parameters so adjusted that the output thereof varies in magnitude as a linear function of the frequency of the input signals. Thus, low frequency signals, for example, 500 cycles, will have substantially no output, while high frequency signals, for example, 5000 cycles, will produce a large voltage output. The output of filter discriminator 29 is fed to a rectifier 30 with the result that the output of rectifier 30 is a varying direct current potential whose magnitude varies as a linear function of the frequency recorded on the elemental areas of disk 20. Since the frequency recorded on these elemental areas varies as a linear function of the depth of water body 12, the magnitude of the voltage output of rectifier 30 will vary as a linear function of the depth of water 12 for substantially the last half hour during which measurements of such depths were taken. Since disk 20 rotates approximately once every second, all the recorded readings will be fed through the rectifier 30 once every second.

The output of rectifier 30 is applied across the vertical deflection plates 31 of a cathode ray tube 32. The horizontal deflection plates 33 of cathode ray tube 32 are fed from a saw-tooth horizontal sweep generator 34 of any desired type such as, for example, the well known gas discharge relaxation oscillator. Horizontal sweep generator 34 is synchronized to the rotation of disk 11 by having a cam 35 attached to disk 11 actuate the movable arm 36 of a pair of contacts. Movable arm 36 which is pivoted, as at 37, is connected to ground and resiliently biased away from a stationary contact 38 by a spring 39. Actuation of movable contact 36 by cam 35 produces contact between arm 36 and contact 38, thereby triggering the horizontal sweep generator to initiate the sweep. This triggering may be accomplished in any well-known manner, for example, by having contact 38 attached to the grid of a gas tube in sweep generator 34 to overcome a normal negative bias on said grid, thereby firing the gas tube and initiating the saw-tooth sweep. Application of the saw-tooth output of generator 34 to deflection plates 33 will cause the beam of the cathode ray tube to move across the face of the tube, as shown here by way of example, from left to right. Triggering of the sweep generator is timed by the position of cam 35 such that the last elemental area magnetized by recording head 19 will be substantially under the pickup head 27 at the time the horizontal sweep generator is triggered. The beam of the cathode ray tube which at this time is on the left of the tube face will be deflected downward from a horizontal reference line which corresponds to the zero depth by an amount which corresponds to the depth of the water body 12 as recorded on disk 20. The downward deflection is accomplished by polarizing the rectifier such that the varying D. C. voltage, produced at the output thereof, is negative. As disk 20 rotates past pickup 27 and horizontal sweep generator 34 applies an increasing voltage to the horizontal deflection plates, the beam of the cathode ray tube will move slowly across the face of the tube and at the same time be deflected vertically in proportion to the depths recorded around the periphery of disk 20. The resultant trace produced on the cathode ray tube will indicate the depth of the water body 12 for substantially the preceding half hour. Since the horizontal sweep is synchronized to disk 11, the trace will move across the cathode ray tube substantially once a second displaying all the recordings on the disk 20 during each cycle of the trace. Since information is being continuously recorded and erased from disk 20, the trace produced on tube 32 will have an outline which appears to move slowly across the face of the tube, it requiring substantially a half hour for a particular point of the trace outline to traverse the face of the tube. Thus, it may be seen that information for a predetermined prior time may be continuously displayed with new information being continuously added and information of a predetermined age being constantly erased.

This completes the description of the specific embodiment of the invention disclosed herein. However, many modifications thereof will be apparent to persons skilled in the art. For example, a magnetic tape or other magnetic storage means could be used in place of the magnetic disk 20. The frequencies used herein may be varied considerably for specific applications as desired, and the storage mechanism is not necessarily limited to use for a depth sounder equipment or distance measuring equipment but may be used to record any desired type of information. Therefore, applicant does not wish to be limited to the particular details of the species of the invention described herein except as defined by the appended claims.

What is claimed is:

1. An information recording device comprising an information storing medium, means for cyclically moving said medium relative to a recorder to record information in said medium, and means for energizing said recorder to record information during predetermined separate portions of successive cycles.

2. An information recording device comprising an information storing medium, means for cyclically moving said medium relative to a recorder to record information in said medium, said recorder being energized to record information during a predetermined small portion of the cycle, and means for varying the position of said portion in said cycle.

3. An information recording device comprising an information storing medium, means for cyclically moving said medium relative to a recorder to record information in said medium, means for energizing said recorder to record information during predetermined different portions of successive cycles, means for cyclically scanning said medium, and means fed by said scanning means for displaying information stored in said medium.

4. A distance measuring and recording device comprising means for measuring said distance, means for generating signals having a frequency which varies as a function of said distance, means for periodically storing said signals, means for scanning said stored signals, and erasing means operative only substantially simultaneously with said storing means for erasing previously stored signals.

5. A distance measuring and recording device comprising means for measuring said distance, means for generating electrical signals having a frequency which varies as a function of said distance, means for periodically storing said signals, means for cyclically scanning said stored signals, and erasing means operative only substantially simultaneously with said storing means on a different portion of said medium from said storing means for easing previously stored signals.

6. A distance measuring and recording device comprising means for measuring said distance, means for generating signals having a frequency which varies as a function of said distance, means for periodically storing said signals, and means for erasing said signals from said storing means a predetermined time after the storage thereof, said erasing means being synchronized for operation only substantially simultaneously with said storing means for erasing previously stored signals.

7. A distance measuring and recording device comprising means for measuring said distance, means for generating electrical signals having a frequency which varies as a function of said distance, means for storing said signals comprising a magnetizable medium, means for cyclically scanning said medium, means comprising a cathode ray tube fed by said scanning means for displaying information stored in said medium, and means synchronized with said storing means for erasing said signals from said storing means a predetermined time after the storage thereof.

8. A distance measuring and recording device comprising means for measuring said distance, means for generating signals having a frequency which varies as a function of said distance, means for storing said signals comprising a magnetizable medium, means for cyclically moving said medium relative to a recorder to record information in said medium, said recorder being energized to record information during a predetermined portion of the cycle, and means for progressively varying the position of said portion in said cycle.

References Cited in the file of this patent

UNITED STATES PATENTS

| | | |
|---|---|---|
| 2,370,134 | Begun | Feb. 27, 1945 |
| 2,378,383 | Arndt et al. | June 19, 1945 |
| 2,378,388 | Begun | June 19, 1945 |
| 2,477,395 | Sunstein | July 26, 1949 |
| 2,574,596 | Slaymaker | Nov. 13, 1951 |